(12) United States Patent
Odate

(10) Patent No.: US 7,766,389 B2
(45) Date of Patent: Aug. 3, 2010

(54) VEHICLE SEATBELT APPARATUS

(75) Inventor: Shotaro Odate, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 132 days.

(21) Appl. No.: 12/236,738

(22) Filed: Sep. 24, 2008

(65) Prior Publication Data
US 2009/0079178 A1 Mar. 26, 2009

(30) Foreign Application Priority Data
Sep. 25, 2007 (JP) ............... 2007-247951

(51) Int. Cl.
*B60R 22/46* (2006.01)
(52) U.S. Cl. ............... 280/806; 280/807; 701/45
(58) Field of Classification Search ........... 280/803, 280/806, 807; 701/45
See application file for complete search history.

(56) References Cited

U.S. PATENT DOCUMENTS

| 6,959,947 | B2 * | 11/2005 | Sakakida et al. ........... 280/803 |
| 7,389,843 | B2 * | 6/2008 | Midorikawa ............... 180/268 |
| 7,604,081 | B2 * | 10/2009 | Ootani et al. ............... 180/282 |
| 7,661,504 | B2 * | 2/2010 | Odate ........................ 180/270 |
| 2001/0004030 | A1 | 6/2001 | Yano et al. |
| 2004/0104570 | A1 * | 6/2004 | Midorikawa et al. ........ 280/807 |
| 2007/0163832 | A1 * | 7/2007 | Midorikawa ............... 180/268 |
| 2008/0191458 | A1 * | 8/2008 | Midorikawa ............... 280/807 |

FOREIGN PATENT DOCUMENTS

JP 2001-163186 6/2001

* cited by examiner

*Primary Examiner*—Toan C To
(74) *Attorney, Agent, or Firm*—Rankin, Hill & Clark LLP

(57) ABSTRACT

A vehicle seatbelt apparatus includes a inhibiting section for inhibiting a belt-reel driving motor from being driven when it determines, on the basis of an output signal from a rotational position detecting unit associated with a belt reel, that variation in the rotational position of the belt reel, which is less than or equal to a predetermined value, has occurred, on condition that a door opened/closed state detecting units detects that a vehicle door has shifted from a closed state to an opened state.

3 Claims, 8 Drawing Sheets

VEHICLE SEATBELT APPARATUS

FIELD OF THE INVENTION

The present invention relates generally to vehicle seatbelt apparatus and, more particularly, to a vehicle seatbelt apparatus which controls a belt storing operation according to the conditions after a door is opened by the vehicle occupant for getting in or out of the vehicle.

BACKGROUND OF THE INVENTION

For a seatbelt apparatus equipped to protect a vehicle occupant seated in a seat of a vehicle, techniques have been implemented in recent years in which any change in the riding posture of the vehicle occupant is reduced by rapidly restraining the occupant with a belt or webbing in an emergency, when there is instability in the travel state of the vehicle (abnormal operation), or the like.

A typical example of such known vehicle seatbelt apparatus is disclosed in Japanese Patent Laid-open Publication (JP-A) No. 2001-163186, corresponding to U.S. Patent Published Application No. 2001/0004030 A1. In the disclosed vehicle seatbelt apparatus, when a vehicle occupant gets out or is going to get out, a seat belt is securely retracted to a predetermined storage position. The seat belt is re-retracted when a buckle switch detects disengagement of the buckle and the tang plate, when an occupant detecting device detects non-presence of the occupant in the automobile, when a door switch detects a door being in the opened state, and when an engine key switch detects that an engine key is pulled out or is in an off state. By thus performing retracting operation two times, the seat belt can be positively retracted into the predetermined storage position.

However, the prior vehicle seatbelt apparatus has a problem that when the vehicle passenger shifts the seat in a forward or backward direction while gripping a tongue plate of the seat belt, the seat belt apparatus detect a pay-out of the seat belt and activates the retractor to take-up the seat belt into the retractor. A retracting movement of the belt thus caused by the belt take-up operation is resistant to and hinders a belt-attaching operation by the vehicle occupant, deteriorating the comfort and convenience of the seatbelt apparatus.

SUMMARY OF THE INVENTION

In view of the foregoing prior art problem, it is an object of the present invention to provide an improved seatbelt apparatus which is able to prevent the occurrence of a belt-retracting operation by a retractor when the vehicle occupant is attempting to attach a seat belt with a vehicle door being in the opened state.

To achieve the above-mentioned object, the present invention provides a seatbelt apparatus for a vehicle, which comprises a belt reel having a belt wound thereon, a motor for rotationally driving the belt reel to take up the belt, rotational position detecting means for detecting a rotational position of the belt reel, control means for, on the basis of an output signal from the rotational position detecting means, controlling an amount of electric power to be supplied to the motor, and door opened/closed state detecting means for detecting an opening/closed state of a door of the vehicle. The seatbelt apparatus further including inhibiting means for inhibiting the motor from being driven when it determines, on the basis of an output signal from the rotational position detecting means, that variation in the rotational position of the belt reel, which is less than or equal to a predetermined value, has occurred, on condition that the door opened/closed state detecting means detects that the door has shifted from a closed state to an opened state.

With this arrangement, when the vehicle occupant shifts the seat while gripping a tongue plate on condition that the vehicle door is in the opened state, the seat belt is payed out a distance corresponding to the displacement of the seat. In this instance, however, a belt take-up operation by the belt reel does not take place because driving of the motor is inhibited by the inhibiting means. Thus, the comfort and convenience of the seatbelt apparatus are very high.

Preferably, the seatbelt apparatus further comprises rotation speed detecting means for detecting a rotation speed of the belt reel, wherein the inhibiting means inhibits the motor from being driven when the rotation speed detected by the rotation speed detecting means is equal to or smaller than a second predetermined value.

Preferably, the control means includes pre-standby take-up means for driving the motor so as to take-up the belt into a predetermined storage position before the control means transits to a standby state when a predetermined time passes after turning off of an ignition switch of the vehicle.

BRIEF DESCRIPTION OF THE DRAWINGS

One preferred embodiment of the present invention will hereinafter be described in detail, by way of example only, with reference to the accompanying drawings, in which.

DETAILED DESCRIPTION OF THE PREFERRED EMBODIMENT

Figure 1:
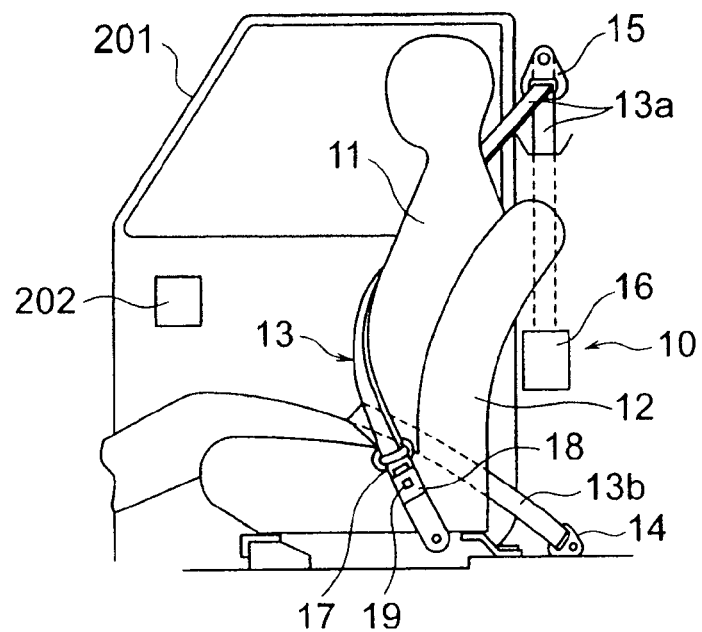
FIG. 1 is a side view showing how a vehicle seatbelt apparatus according to an embodiment of the present invention is attached around the body of a vehicle occupant.

First, a description will be given about a fundamental structure of a vehicle seatbelt apparatus according to an embodiment of the present invention with reference to FIGS. 1 and 2. As shown in FIG. 1, the seatbelt apparatus 10 includes a belt (webbing) 13 for tying or restraining the body of a vehicle occupant 11 in a seat 12. The seatbelt 13 is of a three-point support structure, and it includes an upper belt portion 13a for restraining an upper body portion of the vehicle occupant 11 and a lower belt portion 13b for restraining a waist portion of the vehicle occupant 11. The lower belt portion 13b is fixed at one end thereof to a vehicle body portion, located in a lower area of a vehicle compartment, by means of an anchor plate 14. The upper belt portion 13a is folded back via a through-anchor 15 provided near the shoulder of the vehicle occupant 11, and it is connected at one end to a belt reel of the retractor 16. A tongue plate 17 is attached to a region of the belt 13 where the respective distal ends of the upper and lower belt portions 13a merge with each other. The tongue plate 17 can be attached to or detached from a buckle 18 fixed to one side of a lower seat section of the seat 12. A buckle switch 19 for detecting connection of the tongue plate 17 to the buckle 18 is provided in the buckle 18.

In the illustrated embodiment, the seat 12 is a driver's seat and the vehicle occupant 11 is a driver. A door 201 shown in FIG. 1 is a driver seat door provided on a right front side of the vehicle. The driver seat door 201 is opened and closed when the driver 11 gets in and out of the vehicle. A door opened/closed state detecting unit 202 for detecting an opened/closed state of the driver seat door 201 is provided at an appropriate position on the driver seat door 201. The foregoing configuration of the seatbelt apparatus 10 and the door can be applied to those associated with a front passenger seat or any one of the rear seats.

Figure 2:
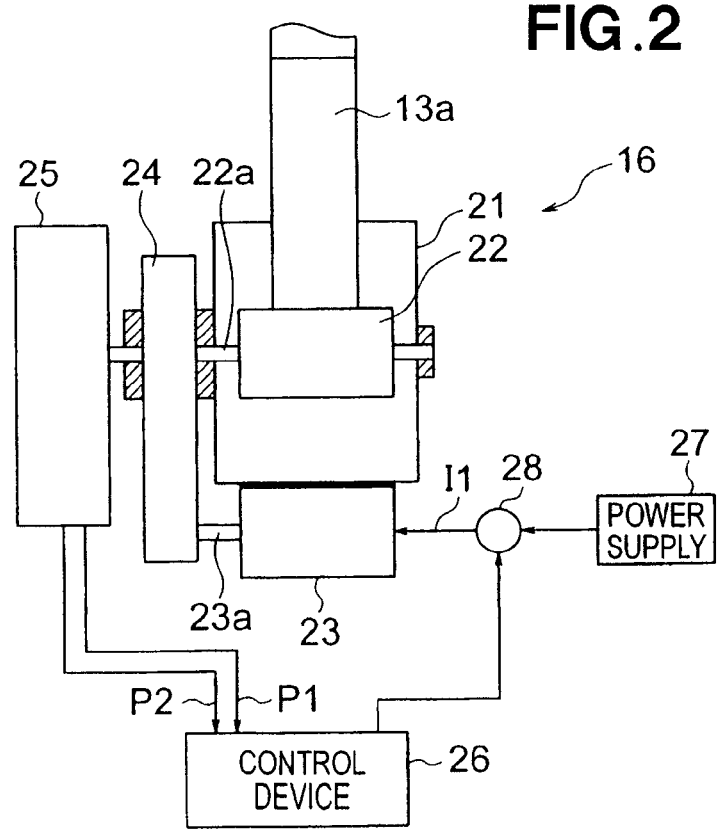
FIG. 2 is a view showing an example construction of a seatbelt retractor employed in the vehicle seatbelt apparatus of the present invention.

FIG. 2 shows an example general construction of a main portion of the seatbelt retractor 16. The retractor 16 includes a belt reel (spindle) 22 rotatably mounted in a housing 21, and a motor 23 for rotationally driving the belt reel 22. The upper belt portion 13a is connected at the one end thereof to the belt reel 22 as noted above, so that it can be taken up by the belt reel 22. The belt reel 22 has a shaft 22a connected, via a power transmission mechanism (e.g., gear mechanism) 24, to a drive shaft 23a of the motor 23. Thus, the belt reel 22 is rotationally driven by the motor 23 via the power transmission mechanism 24. The seatbelt retractor 16 also includes a rotation detecting unit 25 connected to the shaft 22a of the belt reel 22.

The rotation detecting unit 25 preferably comprises a rotation angle sensor that is, for example, in the form of a magnetic sensor unit comprising a combination of a rotatable magnetic disk and two Hall ICs. The minimum angular resolution of the rotation angle sensor may, for example, be 4 degrees, which is about 1.3 to 1.6 mm in terms of the length of the belt 13.

Figure 3:
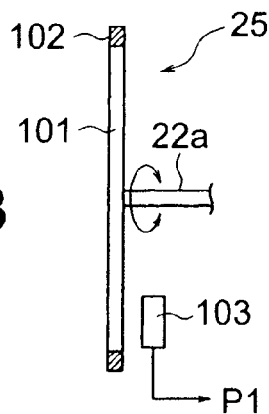
FIG. 3 is a side view showing a main portion of a rotation detecting unit of the vehicle seatbelt apparatus.
Figure 4:
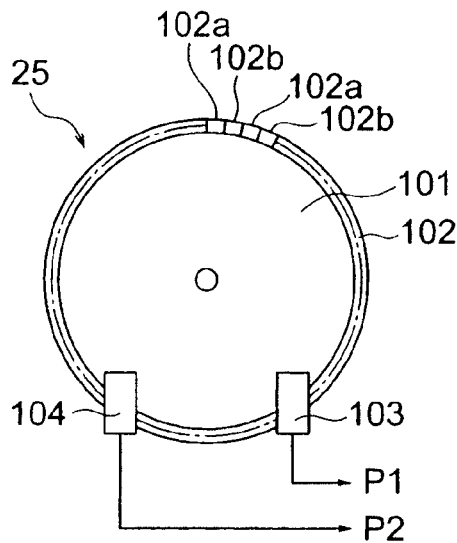
FIG. 4 is a front elevational view of the main portion of the rotation detecting unit.

FIGS. 3 and 4 are a schematic side view and front view, respectively, showing a construction of the rotation detecting unit 25 comprising the magnetic sensor. The magnetic disk 101 of the magnetic sensor is connected at a central portion thereof to the shaft 22a of the belt reel 22 so that the magnetic disk 101 rotates as the shaft 22a of the belt reel 22 rotates. The magnetic disk 101 has an annular magnetic pole section 102 having alternately-arranged minute N and S pole regions 102a and 102b and formed along an outer circumferential edge of the magnetic disk 101. Normally, the annular magnetic pole section 102 is formed through magnetization processing. The N and S pole regions 102a and 102b each have a size necessary to achieve the above-mentioned minimum resolution of the rotation angle sensor. The two Hall IC2 103 and 104, which are magnetically responsive to the N and S pole regions 102a and 102b of the annular magnetic pole section 102, are disposed in suitable positions in proximity to the magnetic pole section 102 of the magnetic disk 101. The two Hall ICs 103 and 104 respectively output two pulse signals P1 and P2, shifted in phase from each other by a predetermined amount, on the basis of positional relationship between the two Hall IC2 103 and 104 and relationship between the Hall ICs 103, 104 and the individual magnetic poles of the magnetic pole section 102 of the magnetic disk 101. On the basis of the phase relationship between the two pulse signals P1 and P2, it is possible to detect a rotation direction of the shaft 22a of the belt reel 22, i.e. whether the shaft 22a of the belt reel 22 is rotating in a belt taking-up direction or in a belt paying-out direction. Stated differently, the two pulse signals P1 and P2 have the characteristics that the temporal phase-leading/lagging relationship (or order) between the two pulse signals P1 and P2 is reversed in accordance with the rotation direction of the shaft 22a of the belt reel 22. Furthermore, it is possible to detect a rotation angle (rotational position or amount of rotation) effected by the rotation of the shaft 22a of the belt reel 22, by counting the number of pulses in either one of the two pulse signals P1 and P2. It is also possible to detect a rotation speed of the shaft 22a of the belt reel 22 by computation of such rotation speed using a variation in the rotation angle.

The two pulse signals P1 and P2, output from the aforementioned rotation detecting unit 25, are supplied to a control device 26 as shown in FIG. 2. As will be described below in relation to FIG. 5, the control device 26 has various functions (functional sections) for performing various signal processing operations by use of the two pulse signals P1 and P2 supplied from the rotation detecting unit 25.

Figure 5:
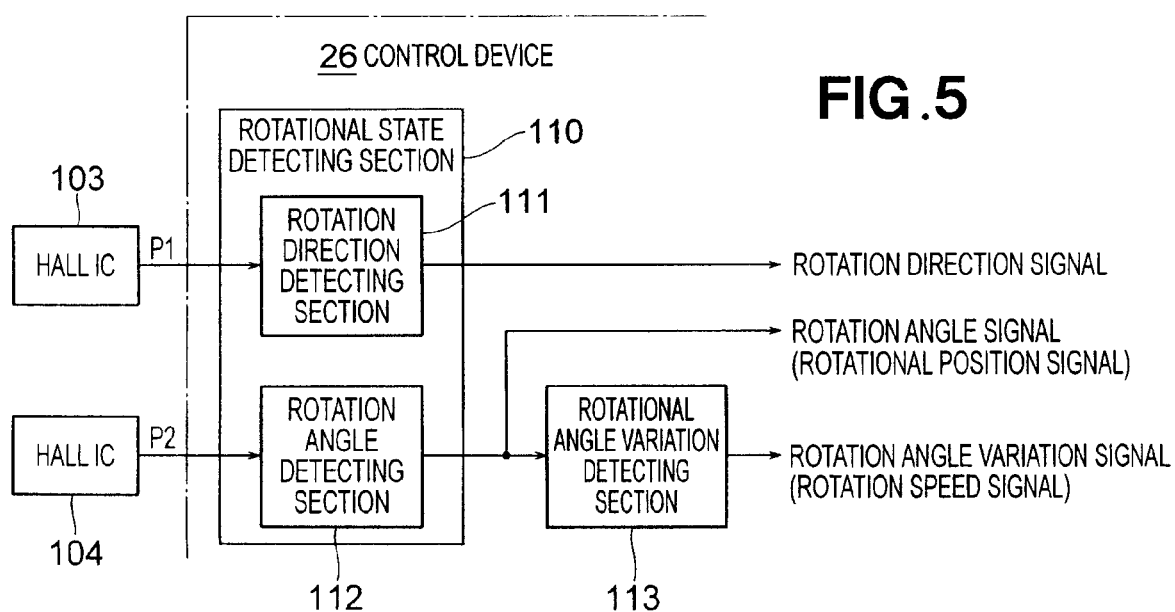
FIG. 5 is a block diagram showing an example construction of a rotational state detecting section incorporated in a control device.

As shown in FIG. 5, the control device 5 includes a rotational state detecting section 110 for detecting a rotational state (or state of rotational operation) of the belt reel 22 on the basis of the two pulse signals P1 and P2. The terms "rotational state" is used herein to represent a broad concept involving not only the above-mentioned rotation direction and rotation angle (rotational position or amount of rotation) of the belt reel 22, but also a belt take-up position of the belt reel 22 and a variation in the belt take-up position of the belt reel 22.

In other words, the rotational state detecting section 110 is a functional section for detecting and processing a rotational state of the shaft 22a of the belt reel 22 having the belt 13 wound thereon. The rotational state detecting section 110 includes a rotation direction detecting section 111 and a rotation angle detecting section 112. A rotation angle variation detecting section 113 receives a rotation angle signal output from the rotation angle detecting section 112 of the rotational state detecting section 110, and it detects a variation in the received rotation angle signal per unit time to thereby output a rotation angle variation signal representative of a rotation speed of the belt reel. The rotation angle variation signal output from the rotation angle variation detecting section 113 is used as information for detecting a current take-up position of the belt reel 22. Belt take-up operation by the retractor 16 is controlled by the control device 26 on the basis of the belt-take-up position information.

Referring back to FIG. 2, the control device 26 controls the belt take-up operation of the retractor 16 by controlling, by means of an adjustment section 28, an amount of a driving electric current I1 to be supplied from a power supply 27 to the motor 23. The seatbelt retractor 16, whose operation is controlled by the control device 26, is constructed as an electric-type pretensioner (E-PT) for holding the vehicle occupant 11 in a proper posture and position.

As described above, the two detection signals (pulse signals) P1 and P2 of different phases output from the rotation detecting unit 25 are input to the control device 26, and the necessary processing is carried out in the control device 26 in order to ultimately extract a rotation direction signal, a rotational position signal, and a rotation speed signal by using these signals P1 and P2.

The operation of the retractor 16 is controlled by the various control functions of the control device 26. The control device 26 controls the belt take-up operation, belt pay-out operation and other operations performed by the retractor 16 by controlling via the adjustment section 28 the amount of driving current I1 supplied from the power supply 27 to the motor 23.

The vehicle occupant 11 sitting in the seat 12 is protected or restrained by the belt 13, is prevented from changing its posture and position, and is kept in a desirable stable state when there is an emergency and instability in the travel state of the vehicle.

Whereas the vehicle seatbelt apparatus 10 and retractor 16 etc, included in the seatbelt apparatus 10 have been described above as provided on the driver seat, a similar seatbelt apparatus 10, retractor 16, etc. are also provided on a front passenger seat. In the following description, various components provided on the driver seat will sometimes be mentioned with a prefix "R-side", while various components provided on the front passenger seat will sometimes be mentioned with a prefix "L-side.

Next, a control system for the seatbelt apparatus 10 or the like will be explained from a hardware standpoint with reference to a block diagram shown in FIG. 6.

Figure 6:
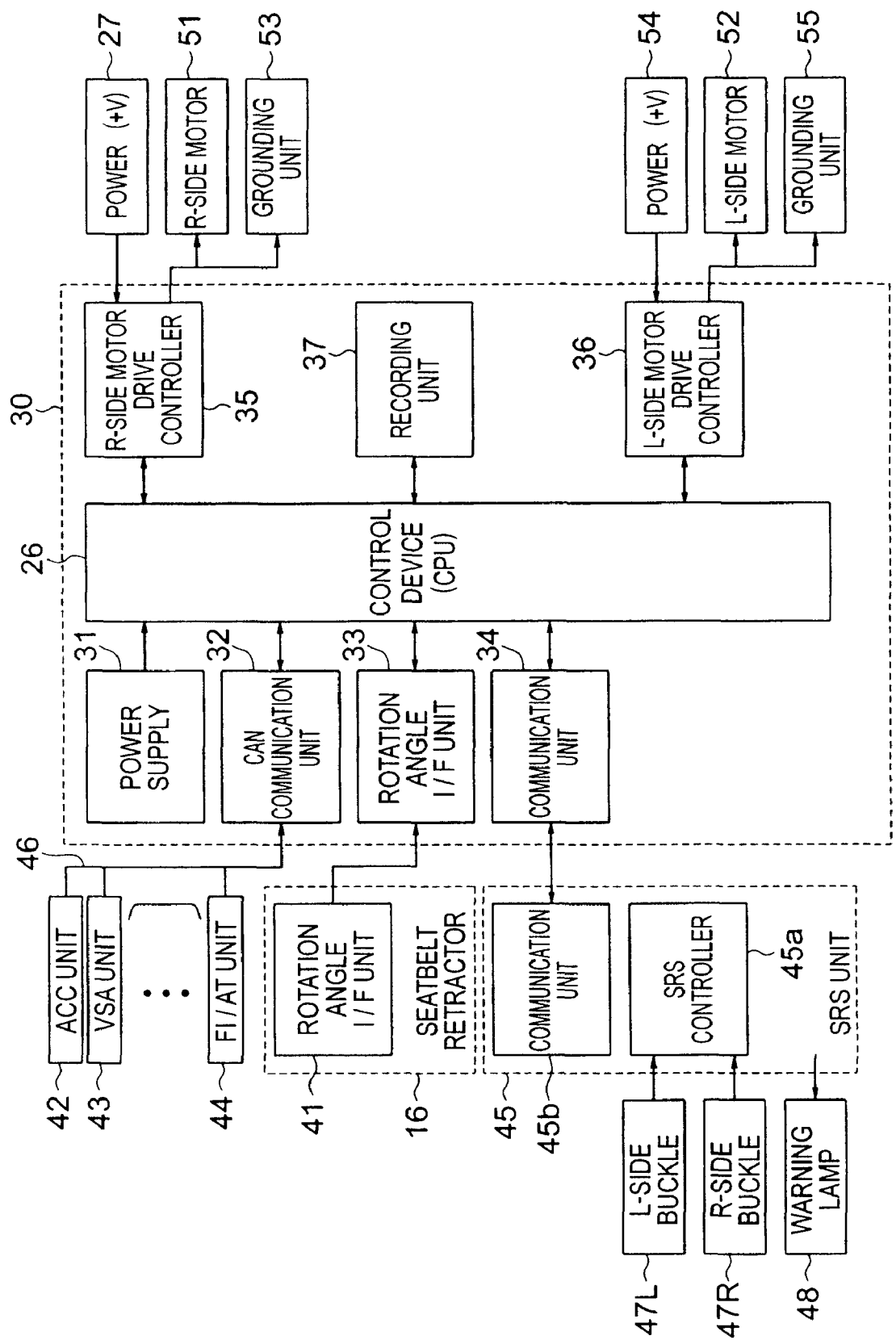
FIG. 6 is a block diagram showing the general configuration of a control system of the seatbelt apparatus according to the present embodiment.

As shown in FIG. 6, the control device 26 comprises a CPU. A block 30, which includes the control device 26, shows an electrical pretensioner unit for maintaining riding posture of the vehicle occupant 11 by using a seatbelt. The block 30 has a power supply section 31, an in-vehicle network (commonly known as "CAN" or "Controller Area Network") communication unit 32, a rotation angle interface (I/F) unit 33; and a communication unit 34 on the input side of the control device (CPU) 26, and an R-side motor drive controller 35, an L-side motor drive controller 36 and a recording unit 37 on the output side of the control device (CPU) 26. The recording unit 37 is a storage device for storing data and a control program.

A block that shows the retractor 16 as an example of a seatbelt retractor is provided on the input side of the block (electrical pretensioner unit) 30. The retractor 16 includes a rotation angle interface (I/F) unit 41 for transmitting a detection signal output from the previously described rotation detecting unit 25 to the control device 26. The rotation angle I/F unit 41 is connected to the rotation angle I/F unit 33 in the block 30, and a detection signal is sent to the rotation angle I/F unit 33. The retractor 16 is provided to each of the driver seat side, the front passenger seat side, and the like.

At an input side of the block 30, there are further provided an ACC (Adaptive Crouse Control) unit (i.e., unit for controlling an obstacle detection device, etc.) 42, a VSA (Vehicle Stability Assist) unit (i.e., vehicle behavior stability control unit) 43, an FI/AT (Fuel Injection/Automatic Transmission) unit 44, an SRS (Supplement Restraint System) unit 45, and the likes. The elements on the input side include a vehicle speed sensor and various other detecting units for detecting the travel or behavioral state of the vehicle, and the aforementioned door opened/closed state detecting unit 202. The ACC unit 42, VSA unit 43, FI/AT unit 44, and the like supply such output signals to the CAN communication unit 32 through the in-vehicle network 46. The SRS unit 45 has an SRS controller 45a for receiving signals from an R-side buckle 47R and an L-side buckle 47L, and a communication unit 45b. The R-side buckle 47R corresponds to the aforementioned buckle 17 on the driver side, and the L-side buckle 47L is the buckle of the seatbelt apparatus provided on the front passenger side. Signals output from the R-side buckle 47R and the L-side buckle 47L are detection signals of a built-in buckle switch. The SRS controller 45a receives signals from the R-side buckle 47R and the L-side buckle 47L, whereupon the signals are sent to the communication unit 32 of the block 30 via the communication unit 45b. Further, when the seat belt is not being used properly during travel of the vehicle, the SRS unit 45 gives a warning signal to a warning lamp 48.

At an output side of the block 30, there are provided an R-side motor 51 and an L-side motor 52. The R-side motor 51 is a motor for driving the seatbelt apparatus of the drive seat side, and is installed corresponding to an R-side motor drive controller 35. The R-side motor drive controller 35 controls an amount of supplied electric power from the power supply (+V) 27, on the basis of a control instruction signal given from the control device 26, to thereby supply a driving current to the R-side motor 51. A block 53 is a grounding unit. The L-side motor 52 is a motor for driving the seatbelt apparatus of the front passenger seat side, and is installed corresponding to an L-side motor drive controller 36. The L-side motor drive controller 36 controls an amount of supplied electric power from a power supply (+V) 54, on the basis of a control instruction signal given from the control device 26, to thereby supply a driving current to the L-side motor 52. A block 55 is a grounding unit. The grounding units 53 and 55 are grounding terminals forming part of the vehicle body.

Figure 7:
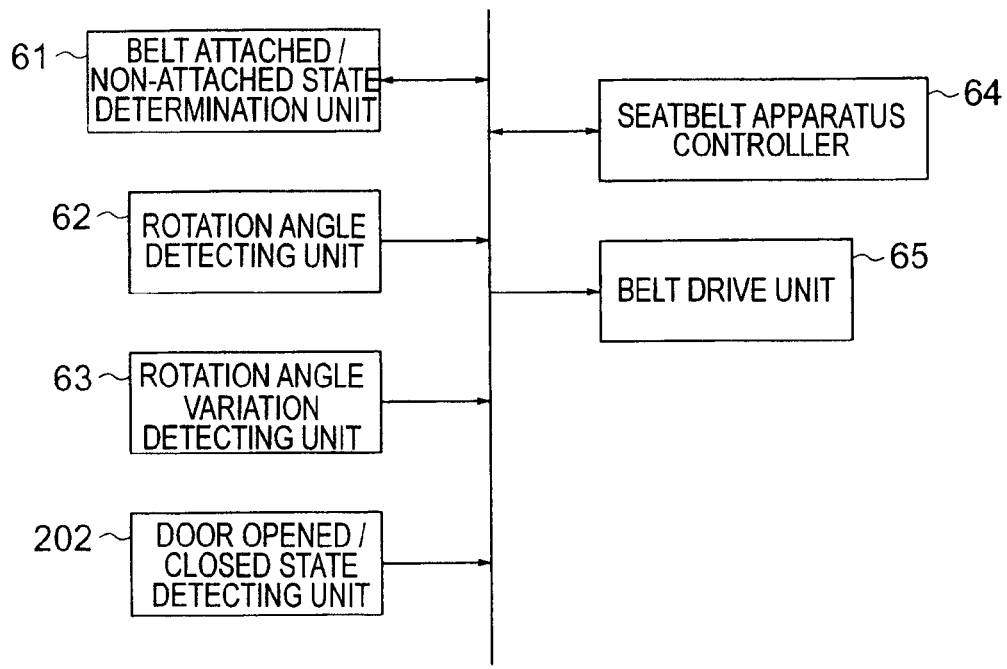
FIG. 7 is a functional block diagram showing a partial functional configuration of the control system.

FIG. 7 is a functional block diagram schematically showing the configuration of a base function unit of the control system of the seatbelt apparatus 10 according to the present embodiment of the invention. The control system has, as main elements, a belt attached/non-attached state determination unit (buckle detection unit, etc.) 61, a rotation angle (rotational position) detecting unit 62, a rotation angle variation (rotation speed) detecting unit 63, the door opened/closed state detecting unit 202, a seatbelt apparatus controller 64, and a belt drive unit 65.

The belt attached/non-attached state determination unit 61 is a means for determining whether the belt 13 is attached to the vehicle occupant 11 seated in the seat 12. In the illustrated embodiment, the attached/non-attached state of the belt 13 is determined by the ON/OFF state of the buckle switch 19. The rotation angle detecting unit 62 and the rotation angle variation detecting unit 63 correspond to the rotation angle detecting section 112 (FIG. 5) and the rotation angle variation detecting section 113 (FIG. 5), respectively. The door opened/closed state detection unit 202 is a detecting unit as described above.

The seatbelt apparatus controller 64 has a restraint control function (restraint control for evading danger in an emergency or the like) for the normal protection of a vehicle occupant as an electrical pretensioner, a storage control function for storing the belt in the original position (storage position in which the belt is completely stored) after the attached seatbelt is released, a function for detecting a state of jamming of the belt when performing the storage control, and a function for changing a determination condition for detecting the jamming state of the belt 13. The last-mentioned function constitutes one important feature of the present embodiment. The seatbelt apparatus controller 64 is constituted by an arithmetic processing function of the control device (CPU) 26, the R-side motor drive controller 35, and the L-side motor drive controller 36 shown in FIG. 6.

The belt drive unit 65 corresponds to the above-mentioned retractor 16 and, more specifically, is composed of the above-mentioned R-side motor 51 and the L-side motor 52.

Next, typical operation control examples of the seatbelt apparatus 10 implemented using the seatbelt apparatus controller 64 and the like will be explained based on the flowcharts shown in FIGS. 8 through 11. The R-side motor 51 will be used in these examples.

Normally, in order to drive a vehicle (the vehicle in question), a vehicle occupant 11 is seated in the seat 12, the belt 13 is wrapped around the occupant's body, and the tongue plate 17 is connected to the buckle 18 (R-side buckle 47R), whereupon the belt 13 is attached to the body of the vehicle occupant 11. The built-in buckle switch 19 is turned on or otherwise activated at this time, and the buckled (or attached) state of the belt 13 is detected. Conversely, when the vehicle has arrived at the destination and the vehicle occupant 11 seated in the seat 12 removes the tongue plate 17 from the buckle 18, the buckle switch 19 is turned off or otherwise deactivated, and an unbuckled (or non-attached) state of the belt is detected. Normally, when the buckled state of the belt 13 is released, the belt 13 is in a free state whereupon based on a "storage control" function of the electrical pretentioner unit 30 of the retractor 16, the belt 13 is retracted into the original position (fully-stored position) and stored in the retractor 16 by being wound on the belt reel 22.

Figure 8:
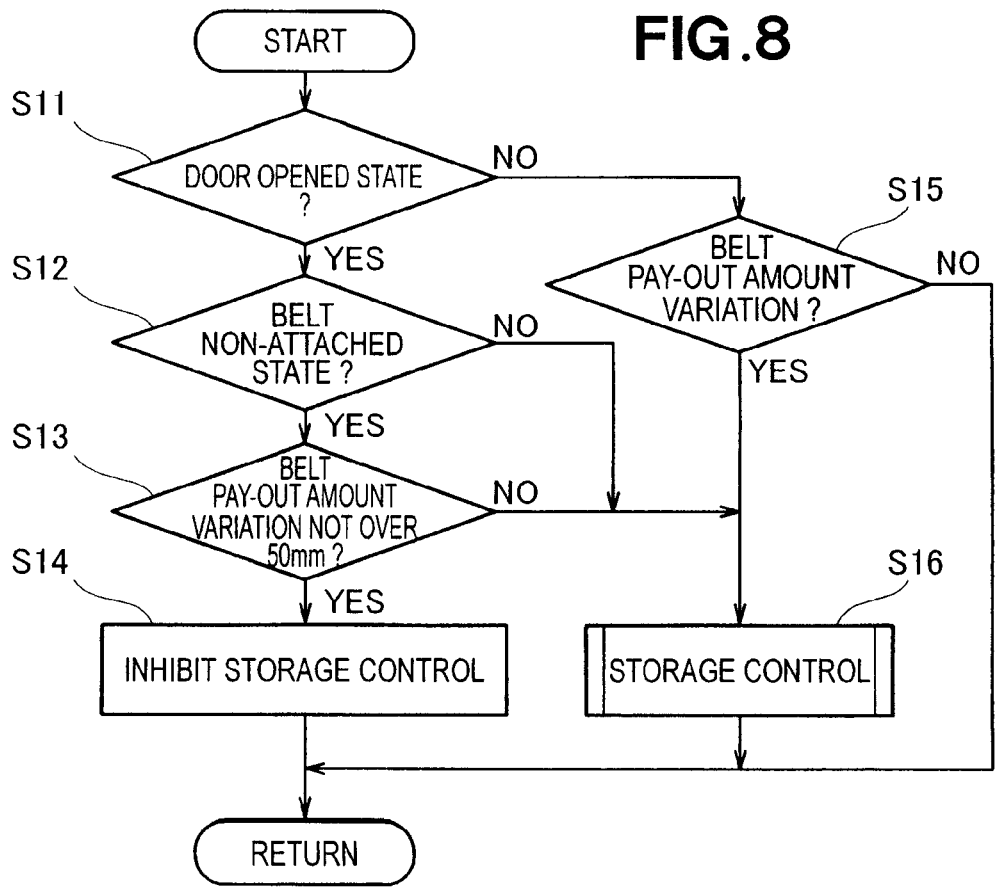
FIG. 8 is a flowchart showing a typical first control flow of the seatbelt apparatus according to the present embodiment.

The flowchart in FIG. 8 shows a control flow or procedure performed when the vehicle occupant 11 opens the door 201, gets in the vehicle and is going to sit in the seat 12.

In the flowchart of FIG. 8, the seatbelt apparatus controller 64 determines, on the basis of a detection signal output from the door opened/closed state detecting unit 202, whether the door 201 has shifted from the closed state to the opened state (initial determination step S11). If the door 201 is determined to be in the opened state (i.e., YES determination) at step S11, control proceeds to the next determination step S12 where a determination is made as to whether the belt 13 is in the non-attached state, on the basis of a determination signal supplied from the belt attached/non-attached state determination unit 61. If the belt 13 is in the non-attached state (i.e., YES determination at step S12), control advances to the third determination step S13. Alternatively, if the belt 13 is not in the non-attached state or otherwise in the attached state (i.e., NO determination at step S12), control branches to step S16 where "storage control" is carried out. At the third determination step S13, a determination is made as to whether variation in the pay-out amount of the belt 13 (variation in the take-up position of the belt 13, or variation in the rotational position of the belt reel 22), which is less than or equal to, for example, 50 mm, has occurred. With a YES determination at step S13, control goes to step S14 where an operation not to perform the "storage control" is executed. Alternatively, if a NO determination has been made at step S13, this means that variation in the pay-out amount of the belt 13 (or variation in the rotational position of the belt reel 22), which is greater than 50 mm, has occurred, and control branches to step S16 where the "storage control" is carried out. Although in the present embodiment the maximum belt pay-out amount variation threshold is set to 50 mm, this threshold value is not limitative but may be set to a given constant value.

If a NO determination has been made at step S11, which indicates the closed state of the door 20, control branches to step S15 where a further determination is made as to whether variation in the pay-out amount of the belt 13 has occurred. With a YES determination at step S15, control proceeds to step S16 where the "storage control" is carried out.

As described above, when the vehicle occupant 11 gets in the vehicle from the door 201, the "storage control" at step S15 is performed on condition that (1) with the door 201 is in the open state, when the belt 13 is brought to an attached (or buckled) state, or variation in the belt pay-out amount, which is greater than 50 mm, has occurred; or (2) with the door 201 is in the closed state, when variation in the belt pay-out amount has occurred. The "storage control" is not performed when the door 102 has shifted from the closed state to the opened state and, with the belt 13 being in the non-attached (or unbuckled) state, when variation in the pay-out amount of the belt 13, which is less than and equal to a predetermined constant value (for example, 50 mm), has occurred. In the latter case, a belt storing operation of the seatbelt apparatus 10 based on the "storage control" is practically inhibited, and the steps S12, S13 and S14 realize an inhibiting means for inhibiting the belt storing operation of the seatbelt apparatus 10. If a belt storing operation by the seatbelt apparatus 10 takes place due to accidental catching of the belt 13 by the vehicle occupant 11 or a part of the seat 12 occurring when the vehicle occupant 11 gets in the vehicle, it will pose a resistance to the vehicle occupant 11 who is attempting to attach the seatbelt. In the seatbelt apparatus 10 according to the present invention, such belt storing operation does not take place because it is inhibited by the inhibiting means (formed by functional parts based on steps S12, S13 and S14). In practice, the inhibiting means inhibits driving of the motor 51. Examples of the aforementioned accidental catching of the belt 13, which may occur when the vehicle occupant 11 gets in and out of the vehicle, include a case in which the vehicle occupant 11 unintentionally catches the belt 13 and pays out the belt 13 from the retractor 16, and a case in which a part of the seat 12 catches the belt 13 and pays out the belt 13 from the retractor 16 while the vehicle occupant 11 shifts the seat 12 to a different position. In these cases, it is desirable that the belt storing operation by the seatbelt apparatus 12 does not take place.

If a NO determination has been made at step S15, or step S14 or step S16 has been executed, control flow is completed.

In the control flow shown in FIG. 8, the determination step S13 uses, as a criterion for judgment or determination, a variation in the pay-out amount of the belt 13 (or variation in the take-up position of the belt 13), that is, variation in the rotational position of the belt reel 22, by the use of a detection signal from the rotation angle detecting unit 62. As an alternative, a rotation speed of the belt reel 22 obtained by using a detection signal from the rotation angle variation detecting unit 63 can be used as the judgment criterion in the step S13. In the latter case, on condition that the rotation speed of the belt reel 22 is less than or equal to a predetermined constant value, the operation of the seatbelt apparatus 10 and, more specifically, driving of the motor 51 are inhibited by the inhibiting means.

Figure 9:
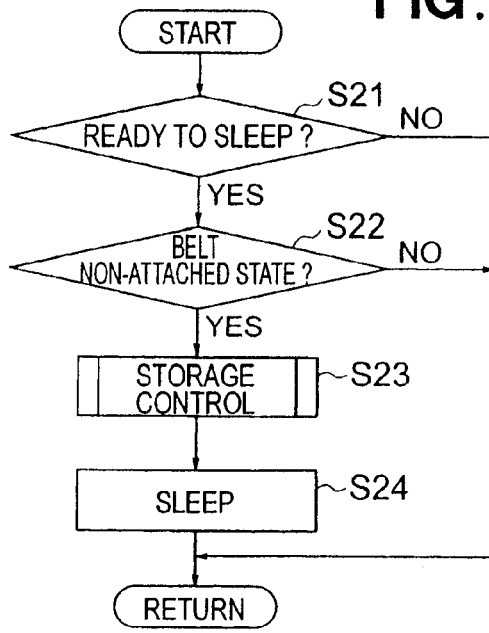
FIG. 9 is a flowchart showing a typical second control flow of the seatbelt apparatus according to the present embodiment.

The flowchart in FIG. 9 shows a control flow or procedure performed when the vehicle occupant 11 shuts off an engine and gets out of the vehicle. In this case, a main concern is whether or not the seatbelt apparatus controller 64 for controlling operation of the seatbelt apparatus 10 is in a transition stage from one state to a sleep (or standby) state. Normally, on-vehicle controllers including the seatbelt apparatus controller 64 are configured to shift or transit to the sleep state (standby state) when a predetermined time elapses after the turning-off of the ignition switch. According to the control flow shown in FIG. 9, a determination is made as to whether or not the seatbelt apparatus controller 64 is in a transition stage to shift to the sleep state (step S21). If the seatbelt apparatus controller 64 is not prepared to shift or transit to the sleep state (a NO determination at step S21), control is immediately completed without performing any processing operation. With a YES determination at step S21, control proceeds to step S22, where a further determination is made as to whether the belt 13 is in the non-attached (unbuckled) state. With a YES determination at step S22, control goes to a step S23, where the "storage control" is carried out. Subsequently, control proceeds to step S24, where the seatbelt apparatus controller 64 shifts to the sleep state. If a NO determination has been made at step S22, control is completed with no control operation performed.

As explained above, when the seatbelt apparatus controller 64 is in a transition stage to the sleeve state, a determination is made as to whether preparations for the sleep state are completed, so as to ensure that before the seatbelt apparatus controller 64 shifts to the sleep state, a belt storing operation of the seatbelt apparatus 10 based on the storage control is carried out to thereby retract the belt 13 into a predetermined fully-stored position. The storage control will be described in greater detail below.

Next, with reference to FIGS. 10 and 11, a description will be given about control flows or procedures performed when the vehicle occupant gets out of the vehicle. According to the control flows or procedures, it is possible to surely perform a belt storing operation when the vehicle occupant 11 gets out of the vehicle, and also suppress the occurrence of accidental catching of the belt at the vehicle occupant's next ride in the vehicle.

Figure 10:
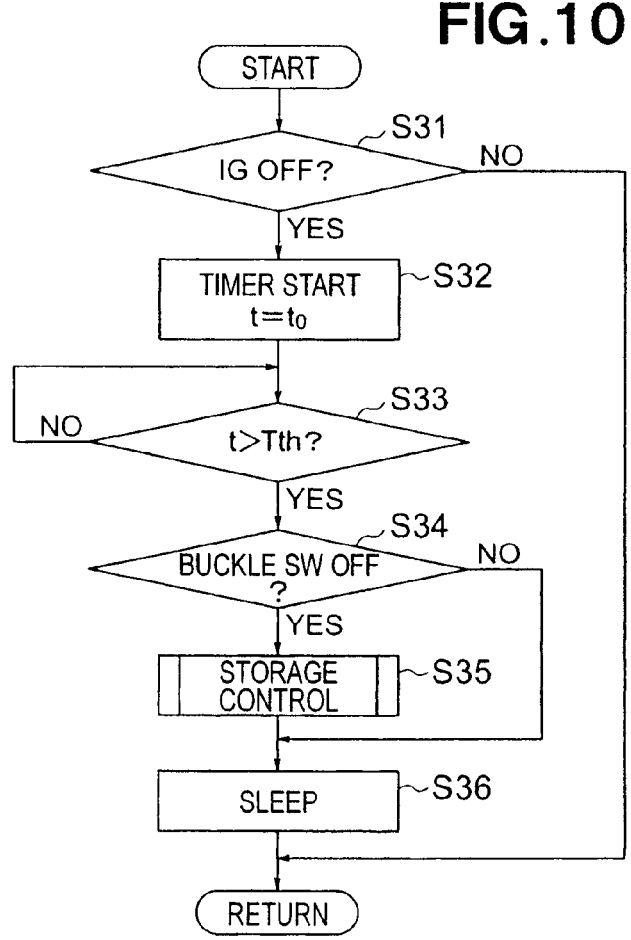
FIG. 10 is a flowchart showing a typical third control flow of the seatbelt apparatus according to the present embodiment.

As shown in FIG. 10, at a first determination step S31 a determination is made as to whether the ignition switch (IG) is OFF. With a YES determination at step S31, time counting by a timer is started with the time variable t set at an initial value to (step S32). If a NO determination has been made at step S31, control is immediately completed. Time counting by the timer continues, and at step S33, it is determined whether the current value of the time variable t has exceeded a predetermined value Tth. With a YES determination (t>Tth) at step S33, control goes to step S34, where a further determination is made as to whether the buckle switch 19 has been turned off. If a YES determination is made at step S34, a belt storing operation according to the "storage control" is carried out at step 35 in the same manner as described above before the seatbelt apparatus controller 64 shifts to the sloop state at step S36. If a NO determination has been made at step S34, it means that the buckle switch 19 is still ON, and control directly goes to step S36, so that the belt storing operation is not performed and the seatbelt apparatus controller 64 shifts to the sleeve state with the buckle switch 19 ON. According to the above-explained control procedure, based on the determination that the buckle switch 19 is turned off after the lapse of a predetermined time Tth set in the timer, the belt storing operation is carried out so that the belt 13 is positively retracted in its fully-stored position. With the belt storing operation thus achieved, it is possible to considerably suppress the occurrence of accidental catching of the belt by the vehicle occupant or a part of the seat at the next ride of the occupant in the vehicle.

Figure 11:
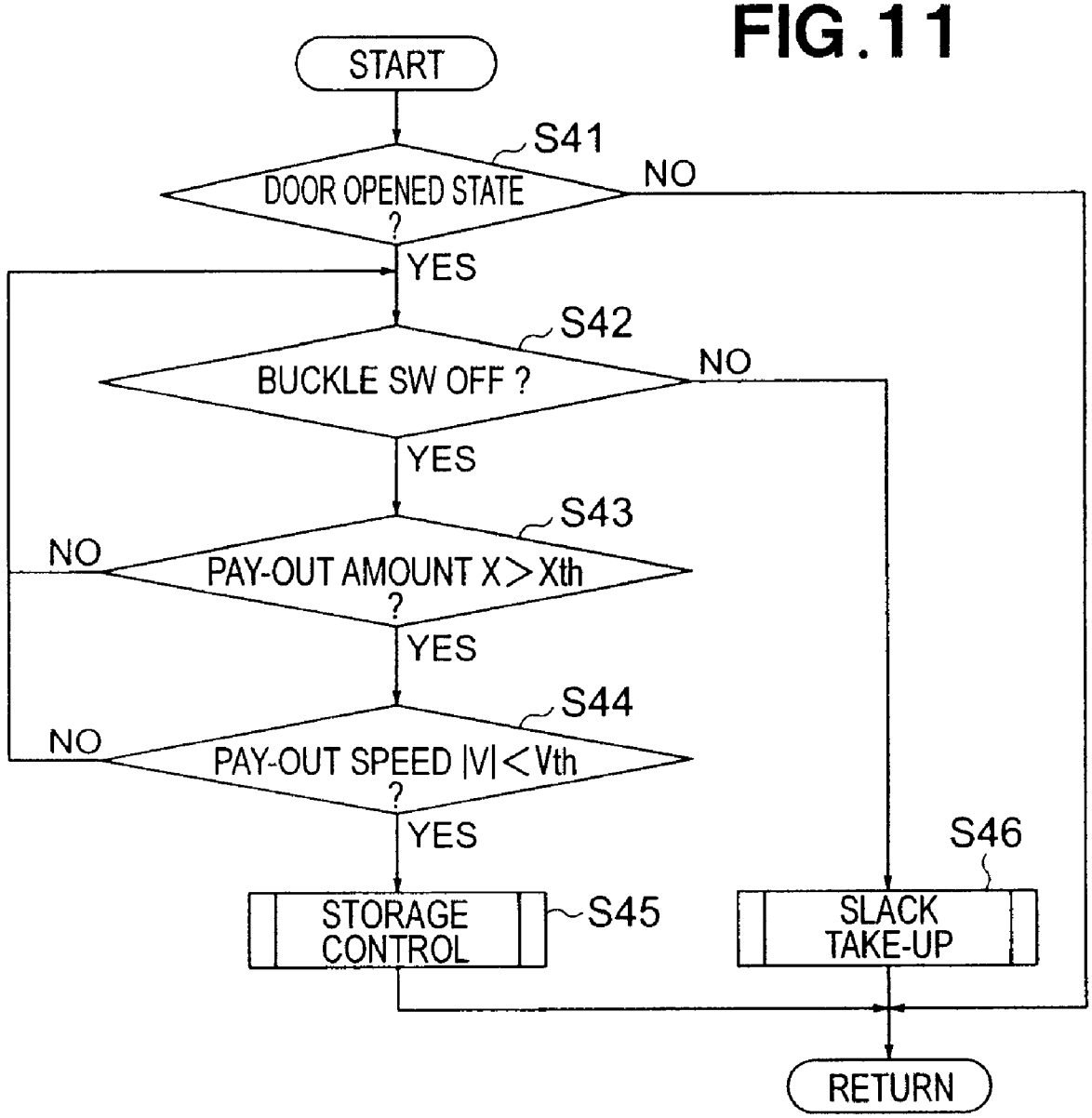
FIG. 11 is a flowchart showing a typical fourth control flow of the seatbelt apparatus according to the present embodiment.

Referring next to FIG. 11, control procedure begins at a first determination step S41, where it is determined whether the door 201 is in the opened state. If the door 201 is in the opened state (i.e., a YES determination at step S41), control proceeds to a second determination step S42, where the buckle switch 19 is OFF. With a NO determination at step S41, control is immediately brought to an end. If a YES determination has been made at step S42, it means that the buckle switch 19 is OFF; and control goes to a third determination step S43, where a determination is made as to whether an amount of pay-out x of the belt 13 has exceeded a predetermined value Xth. If the belt pay-out amount x is less than or equal to the predetermined value Xth (i.e., a NO determination at step S43), the aforementioned determination steps S42 and S43 are repeated. Alternatively, if the belt pay-out amount x is greater than the predetermined value Xth (i.e., a YES determination at step S43), control goes to a fourth determination step S44, where a determination is made as to whether a pay-out speed |V| of the belt 13 is smaller than a predetermined value Vth. In case of a YES determination made at step S44 (i.e., |V|<Vth), control proceeds to step S45, where a belt storing operation according to the storage control is carried out. Thus, when the vehicle occupant gets out of the vehicle, the storage control is performed on condition that the door 201 is in the opened state, and only if, with the door 201 is being in the opened state, the buckle switch 19 is OFF, the belt pay-out amount x is greater than the predetermined value Xth, and the belt pay-out speed |V| is smaller than the predetermined value Vth.

If a NO determination has been made at step S42, control branches to step S46, where "slack take-up" control for taking up slack of the seatbelt 13 is performed.

It will be appreciated that according to the above-described control flow or procedure, when the vehicle occupant gets out of the vehicle, the belt storing operation is surely achieved on an as-needed basis. Furthermore, when the buckle switch 19 is in the ON state, the slack take-up control for taking up slack of the belt 13 is performed. A sequence of operations achieved in the slack take-up control is well known per se. A process for the slack take-up control is well known in the art, wherein once the vehicle occupant 11 seated in the driver seat 12 has the seatbelt 13 attached around its body, the seatbelt 13 is taken up appropriately by the retractor 16 according to a function of the aforementioned electrical pretensioner 30.

Figure 12:
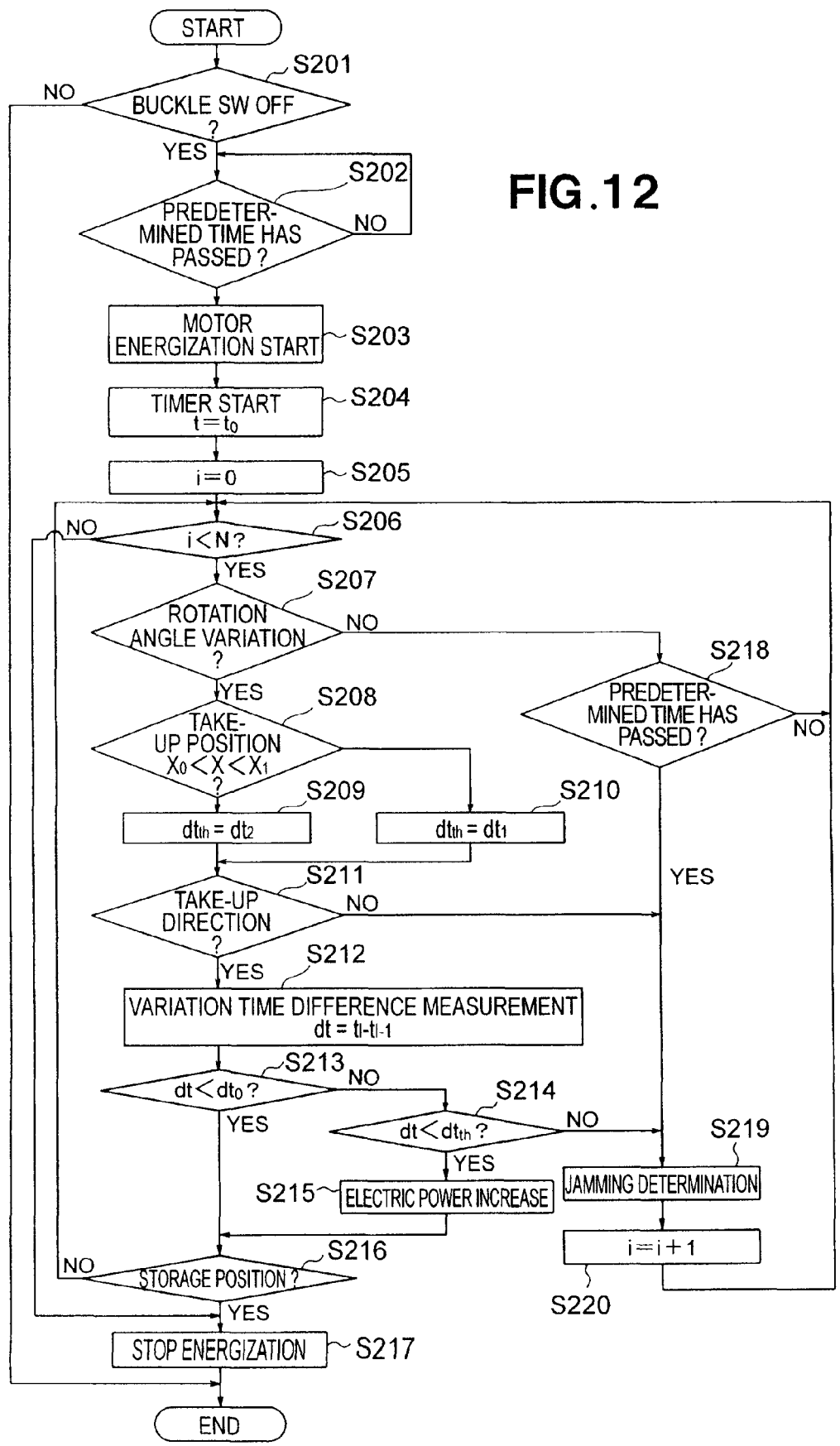
FIG. 12 is a flowchart showing a control flow performed to achieve storage control of the seatbelt apparatus according to the present embodiment.

The following paragraphs describe a control flow of a belt storing operation performed in accordance with the "storage control", with reference to FIG. 12. The belt storing operation control (i.e., "storage control" as achieved at steps S16, S23, S35 and S45) is performed on condition that the buckle switch 19 is OFF (i.e., that a YES determination has been made at step S201). Then, it is determined, at step S202, whether a predetermined time has passed. With a YES determination at step S202, electric current supply to the motor 23 (R-side motor 51, for example) is started to cause the motor to take up the seatbelt at step S203. Then, time counting by a timer is started with the time variable t set at an initial value to at step S204

Then, a predetermined variable i is set at "0" at step S205. The variable i is set as a counter that is used to determine a state of jamming of the belt 13 that may occur during the storing of the belt 13. Jamming of the seatbelt 13 is finally determined when the determination that the belt is currently jammed has lasted until the variable i exceeds a predetermined value N.

At next step S206, a determination is made as to whether the variable i is currently smaller than the value N. If the variable i is smaller than the value N as determined at step S206, control proceeds to step S207, where a further determination is made as to whether variation in the rotation angle of the belt reel 22; the rotation angle of the belt reel 22 can be acquired on the basis of a signal obtained via the above-mentioned rotation detecting unit 25, rotational state detecting section 110, rotating angle detecting section 112, etc.

If the variable i is equal to or greater than the value N at step S206, it is assumed that some locking condition has occurred in the belt storing operation by the retractor 16 due to jamming of the belt 13 occurred during the belt storing operation, and then, control goes to step S217, where the electric power supply to the motor is terminated to stop the belt storing operation.

Presence/absence of variation in the rotation angle of the reel 22 determined at step S207 above is information that can be obtained practically on the basis of two pulse signals P1 and P2 of different phases output from the rotation detecting unit 25.

If no variation has occurred in the rotation angle of the belt reel 22 as determined at step S207 (NO determination at step S207) and such a "no variation" condition has lasted for a predetermined time (YES determination at step S218), it is determined, at step S219, that the belt 13 is currently in a jammed state. Then, the variable i is incremented by one at step S220, after which control reverts to step S206. If NO determination is made at step S206, control immediately goes to step S217. Thus, occurrence of the jammed state of the belt 13 during the belt storing operation is detected and monitored by steps S219 and S220.

If, on the other hand, variation has occurred in the rotation angle of the belt reel 22 as determined at step S207 (YES determination at step S207), control proceeds to step S208, where a further determination is made as to whether or no the current take-up position x of the belt 13 by the belt reel 22 is within a predetermined range ($x_0 < x < x_1$). With a YES determination at step S208, a time difference threshold $dt_{th}$ is set at a value $dt_2$ at step S209. With a NO determination at step S208, the time difference threshold $dt_{th}$ is set at a value $dt_1$ at step S210. After step S209 or step S210, control proceeds to step S211.

At step 211, a further determination is made as to whether or not the current rotation of the belt reel 22 is in the belt taking-up direction. With a NO determination at step S211, it means that the current rotation of the belt reel 22 is not in the normal belt taking-up direction, and thus, control branches to step S219 where it is further determined that the belt 13 is currently in a jammed state. After that, control reverts to step S206 by way of step S220. With a YES determination at step S211, a difference (dt) between the time of the last rotation angle variation ($t_{l-1}$) and the time of the current rotation angle variation ($t_l$) (i.e., $dt = t_l - t_{l-1}$) is measured at step S212.

At next step S213, the measured time difference dt is compared against a first jam-determining reference value $dt_0$ to determine whether the time difference dt is smaller than the reference value $dt_0$. If the time difference dt is smaller than the reference value $dt_0$, it is further determined, at step S216, whether the belt 13 has been stored into a predetermined original storage position (i.e., fully-stored position). With a YES determination at step S216, control proceeds to step S217, where the power supply to the motor is terminated judging that the belt storing operation has been completed. With a NO determination at step S216, control reverts to step S206.

If a NO determination has been made at step S213, i.e. if the time difference dt is not smaller than the reference value $dt_0$, control branches to step S214. At step S214, the measured time difference dt is compared against a second jam-determining reference value $dt_{th}$ to determine whether the time difference dt is smaller than the reference value $dt_{th}$. If the time difference dt is smaller than the second jam-determining reference value $dt_{th}$, the electric power supply to the motor is increased to increase the belt taking-up force at step S215, after which control goes to step S216. If the time difference dt is not smaller than the second jam-determining reference value $dt_{th}$ as determined at step S214, on the other hand, control proceeds to step S219 to determine that the belt 13 is in a jammed state.

Figure 13:
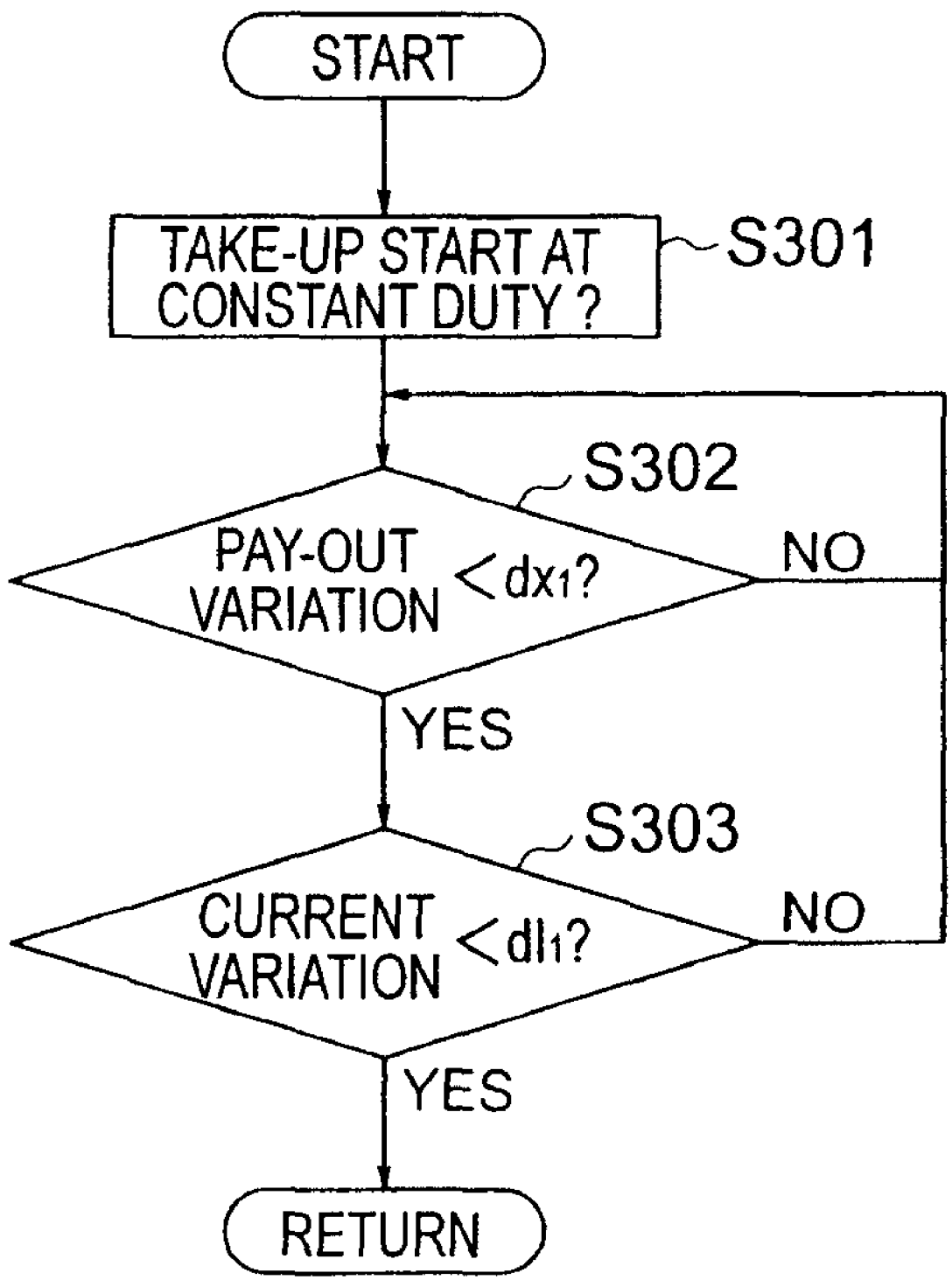
FIG. 13 is a flowchart showing a control flow performed to achieve slack take-up control of the seatbelt apparatus according to the present embodiment.

The following paragraphs describe a control flow of the slack eliminating operation (slack take-up control) performed for taking up slack of the seatbelt 13, with reference to FIG. 13. The slack taking-up or eliminating operation is normally performed on condition that the buckle switch 19 is turned ON upon engagement of the tongue plate 17 with the buckle 18 with the belt 13 wound around a body of the vehicle occupant 11 seated in the seat 12 (as done at step S46 shown in FIG. 11). Though not addressed by the present embodiment, the slack eliminating operation is performed in two different ways depending on the position or state of the ignition switch, namely, one with the ignition switch being in the ON state, the other with the ignition switch being in the OFF state. The first way of control is employed when the seatbelt is brought to an attached (or buckled) state after the engine is started by the ignition switch. The second way of control is employed when the seatbelt is attached before the engine is started.

As shown in FIG. 13, when the slack eliminating operation is to be started, a driving current is supplied at a constant duty factor to the motor 23 to thereby cause a take-up action by the belt reel 13 to start taking up of the belt 13 at step S302. Then, determinations are made successively as to whether variation in the pay-out amount of the belt 13 becomes smaller than a predetermined constant value dx1 as a result of taking-up operation by the belt reel 22 (step S302) and whether variation in the driving current to be supplied to the motor 23 greater than a predetermined value $d_{r1}$ (step S303). Only when a YES determination has been made at each of these two determination steps S302 and S303, it is assumed that the belt has no slack, and the instant slack eliminating operation control flow is brought to an end. If a NO determination has been made at either one of steps S302 and S303, it is assumed that the belt has slack, and the belt taking-up operation at step S301 is continued until a YES determination is mad at each of the two determination steps S302 and 303.

It should be appreciated that various constructions, shapes, sizes, positions, etc. explained above in relation to the preferred embodiment are just for illustrative purposes, and that the present invention is not limited to the embodiment described above and may be modified variously without departing from the scope indicated by the appended claims.

The above-described invention can be suitably used to inhibit a belt storing operation from occurring under a predetermined condition when the vehicle occupant gets in and out of the vehicle, thereby preventing a resistance or hindrance to a belt attaching operation by the vehicle occupant.

Obviously, various minor changes and modifications of the present invention are possible in light of the above teaching. It is therefore to be understood that within the scope of the appended claims the invention may be practiced otherwise than as specifically described.

What is claimed is:

1. A seatbelt apparatus for a vehicle, comprising:
a belt reel having a belt wound thereon;
a motor for rotationally driving the belt reel to take up the belt;
rotational position detecting means for detecting a rotational position of the belt reel;
control means for, on the basis of an output signal from the rotational position detecting means, controlling an amount of electric power to be supplied to the motor;

door opened/closed state detecting means for detecting an opening/closed state of a door of the vehicle; and inhibiting means for inhibiting the motor from being driven when it determines, on the basis of an output signal from the rotational position detecting means, that variation in the rotational position of the belt reel, which is less than or equal to a predetermined value, has occurred, on condition that the door opened/closed state detecting means detects that the door has shifted from a closed state to an opened state.

2. The seatbelt apparatus according to claim 1, further comprising: rotation speed detecting means for detecting a rotation speed of the belt reel, wherein the inhibiting means inhibits the motor from being driven when the rotation speed detected by the rotation speed detecting means is equal to or smaller than a second predetermined value.

3. The seatbelt apparatus according to claim 1, wherein the control means includes pre-standby take-up means for driving the motor so as to take-up the belt into a predetermined storage position before the control means transits to a standby state when a predetermined time passes after turning off of an ignition switch of the vehicle.

* * * * *